(12) United States Patent
Stelmar Netto et al.

(10) Patent No.: US 11,468,134 B2
(45) Date of Patent: Oct. 11, 2022

(54) PROVISIONING A CUSTOMIZED SOFTWARE STACK FOR NETWORK-BASED QUESTION AND ANSWER SERVICES

(71) Applicant: INTERNATIONAL BUSINESS MACHINES CORPORATION, Armonk, NY (US)

(72) Inventors: Marco Aurelio Stelmar Netto, Sao Paulo (BR); Bruno Silva, Sao Paulo (BR); Eric Bueno Gauch, Sao Paulo (BR); Bruno Estima Correia Milanesi Castanhe, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/143,263

(22) Filed: Sep. 26, 2018

(65) Prior Publication Data
US 2020/0097512 A1 Mar. 26, 2020

(51) Int. Cl.
| | |
|---|---|
| *G06F 16/9536* | (2019.01) |
| *G06F 9/455* | (2018.01) |
| *G06F 16/951* | (2019.01) |
| *G06F 11/07* | (2006.01) |
| *G06F 8/61* | (2018.01) |

(52) U.S. Cl.
CPC ......... *G06F 16/9536* (2019.01); *G06F 9/455* (2013.01); *G06F 9/45558* (2013.01); *G06F 11/0709* (2013.01); *G06F 11/0712* (2013.01); *G06F 11/0787* (2013.01); *G06F 11/0793* (2013.01); *G06F 16/951* (2019.01); *G06F 8/61* (2013.01); *G06F 2009/45562* (2013.01)

(58) Field of Classification Search
CPC .... G06F 16/9536; G06F 9/455; G06F 16/951; G06F 11/0712; G06F 11/0787; G06F 11/0793; G06F 11/0709; G06F 8/61; G06F 9/45558; G06F 2009/45562
See application file for complete search history.

(56) References Cited

U.S. PATENT DOCUMENTS

| | | | |
|---|---|---|---|
| 6,859,922 B1 | 2/2005 | Baker et al. | |
| 7,516,457 B2 | 7/2009 | Eilam et al. | |
| 7,979,856 B2 * | 7/2011 | Murray | .................... G06F 8/61 |
| | | | 717/173 |
| 8,990,813 B2 | 3/2015 | Frields et al. | |
| 9,361,084 B1 * | 6/2016 | Costa | ........................ G06F 8/61 |
| 9,519,472 B2 | 12/2016 | McLeod et al. | |
| 9,600,386 B1 | 3/2017 | Thai et al. | |
| 9,720,809 B2 | 8/2017 | Scholl et al. | |
| 10,033,581 B2 * | 7/2018 | Figueroa | ............... H04L 67/306 |

(Continued)

FOREIGN PATENT DOCUMENTS

| | | |
|---|---|---|
| WO | 2009111799 | 9/2009 |
| WO | 2013121394 | 8/2013 |

*Primary Examiner* — Jesse P Frumkin
(74) *Attorney, Agent, or Firm* — Joseph Petrokaitis; Otterstedt & Kammer PLLC (57) ABSTRACT

Systems and methods for provisioning a customized software stack are disclosed. A user inquiry for a technical issue is received from an inquiring user and at least one response to the user inquiry is received. A customized software stack is established for a virtual computing environment based on one or more characteristics similar to one or more user characteristics of a user computing environment of the inquiring user and the at least one response.

22 Claims, 7 Drawing Sheets

(56) References Cited

U.S. PATENT DOCUMENTS

| | | |
|---|---|---|
| 2005/0065937 A1 | 3/2005 | Degenaro et al. |
| 2007/0136579 A1 | 6/2007 | Levy et al. |
| 2008/0071555 A1* | 3/2008 | Sattler .................. G06Q 10/06 705/7.29 |
| 2008/0155534 A1* | 6/2008 | Boss .................. G06F 9/44505 717/178 |
| 2008/0319825 A1 | 12/2008 | LaComb et al. |
| 2009/0070311 A1 | 3/2009 | Feng |
| 2011/0154109 A1 | 6/2011 | Levine et al. |
| 2011/0231288 A1* | 9/2011 | Crisan .................... G06F 8/61 705/27.1 |
| 2011/0258192 A1 | 10/2011 | Yao et al. |
| 2012/0011113 A1 | 1/2012 | Cohen et al. |
| 2013/0036413 A1 | 2/2013 | Venkatesan et al. |
| 2013/0139128 A1 | 5/2013 | Jones et al. |
| 2013/0179863 A1 | 7/2013 | Vangala et al. |
| 2013/0246327 A1 | 9/2013 | Tabrizi |
| 2014/0201372 A1 | 7/2014 | Bauer et al. |
| 2014/0259008 A1* | 9/2014 | Bhattiprolu ............... G06F 8/61 717/174 |
| 2014/0259009 A1* | 9/2014 | Bhattiprolu ............... G06F 8/61 717/174 |
| 2014/0324757 A1 | 10/2014 | Tabrizi et al. |
| 2015/0058824 A1 | 2/2015 | Smiljanic |
| 2015/0135013 A1 | 5/2015 | Thomas et al. |
| 2015/0142878 A1 | 5/2015 | Hebert et al. |
| 2016/0162322 A1 | 6/2016 | Wu et al. |
| 2017/0270120 A1 | 9/2017 | Ajmera et al. |
| 2017/0317949 A1* | 11/2017 | Aharonov ............. G06F 9/5044 |
| 2017/0364806 A1 | 12/2017 | Boyer |
| 2019/0122124 A1* | 4/2019 | Kartchner ............. G06N 5/022 |
| 2019/0324768 A1* | 10/2019 | Antonio ................. G06N 20/00 |
| 2020/0065218 A1* | 2/2020 | Bhosale ............. G06F 11/0793 |

\* cited by examiner

PROVISIONING A CUSTOMIZED SOFTWARE STACK FOR NETWORK-BASED QUESTION AND ANSWER SERVICES

TECHNICAL FIELD

The present invention relates to the electrical, electronic, and computer arts, and more specifically, to infrastructure orchestration and provisioning, and the like.

BACKGROUND

Users and information technology (IT) professionals usually depend on internet-based question and answer (Q&A) platforms, such as forums, to obtain support for a specific software-related question. An error description, for example, may be submitted under a particular topic and a community of users that are subscribed to a topic may be notified when a new question is posted. Each user can use the information provided in the error description in addition to his or her experience and suggest a solution or resources to achieve a solution for that issue (question). The inquiring users may then up-vote or down-vote that answer, building up the community user's reputation.

In some cases, the error description provided lacks some essential information like operating system (OS) and kernel version, compiler, libraries, and other information related to the inquiring user's computing environment that could be used to help users of the community reproduce the error and suggest a more precise answer. Often, most of the time spent on these inquiries is due to the difficulty in finding a solution that matches the inquiring user's system or computing environment.

In a conventional workflow, a user may identify a problem or issue with, for example, a computing environment of the user. The user may search for an answer to his or her problem or issue in a question and answer system, may post a question to a community of users, or both. The inquiring user may copy, download, or otherwise obtain software code, configuration files, and the like and apply them to the user's local computing environment. Depending on the results obtained (i.e., has a solution been found), the inquiring user may adopt the solution, may work with the users of the community to further refine the inquiry, or may work with the users of the community to further refine the solution to the inquiry.

SUMMARY

Embodiments of the present disclosure provide techniques for infrastructure orchestration and provisioning a software stack. In one aspect, an exemplary embodiment includes receiving a user inquiry for a technical issue from an inquiring user; receiving at least one response to the user inquiry; provisioning a virtual computing environment based on one or more characteristics similar to one or more user characteristics of a user computing environment of the inquiring user and the at least one response.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

improved software development;

improved software debugging;

analysis of structured and unstructured data from community users and question and answer services;

ranking of answers provided by community users;

mapping of answers to an environment of an inquiring user; and provisioning a virtual computing environment having characteristics similar to the computing environment of an inquiring user, but containing a solution to the problem of the inquiring user.

These and other features and advantages of the present invention will become apparent from the following detailed description of illustrative embodiments thereof, which is to be read in connection with the accompanying drawings.

DETAILED DESCRIPTION

As noted, embodiments of the present disclosure provide techniques for provisioning a customized software stack.

One or more embodiments advantageously enable a user to access a customized virtual environment in accordance with a technical problem being experienced by the user. The customized virtual environment can, for example, provide a user with an access environment that does not contain the problem(s) related to his or her technical difficulties so that the user can easily make progress in her or his work. Configurations from these virtual environments may be copied directly into the computing environment of the inquiring user.

In one example embodiment, a Q&A service is provided where users may submit technical difficulty queries or search for solutions to existing ones. The users may receive replies from the user community containing a solution to their problem and the system may provision a virtual computing environment having characteristics similar to the computing environment of the inquiring user (such as a similar operating system and software stack), but containing a solution to the problem of the inquiring user. The system may enable a user to test the virtual computing environment via a network (e.g. the Internet, an intranet, and the like), to download the virtual computing environment, and to download parts (e.g. configurations and a software stack) of the virtual computing environment. In a new workflow according to an aspect of the invention, the user may identify a problem and search for an answer in a "Q & A" system and/or post a question to a user group or the like. The user then obtains a virtualized environment generated based on the Q & A data and works with the community to refine the runtime environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
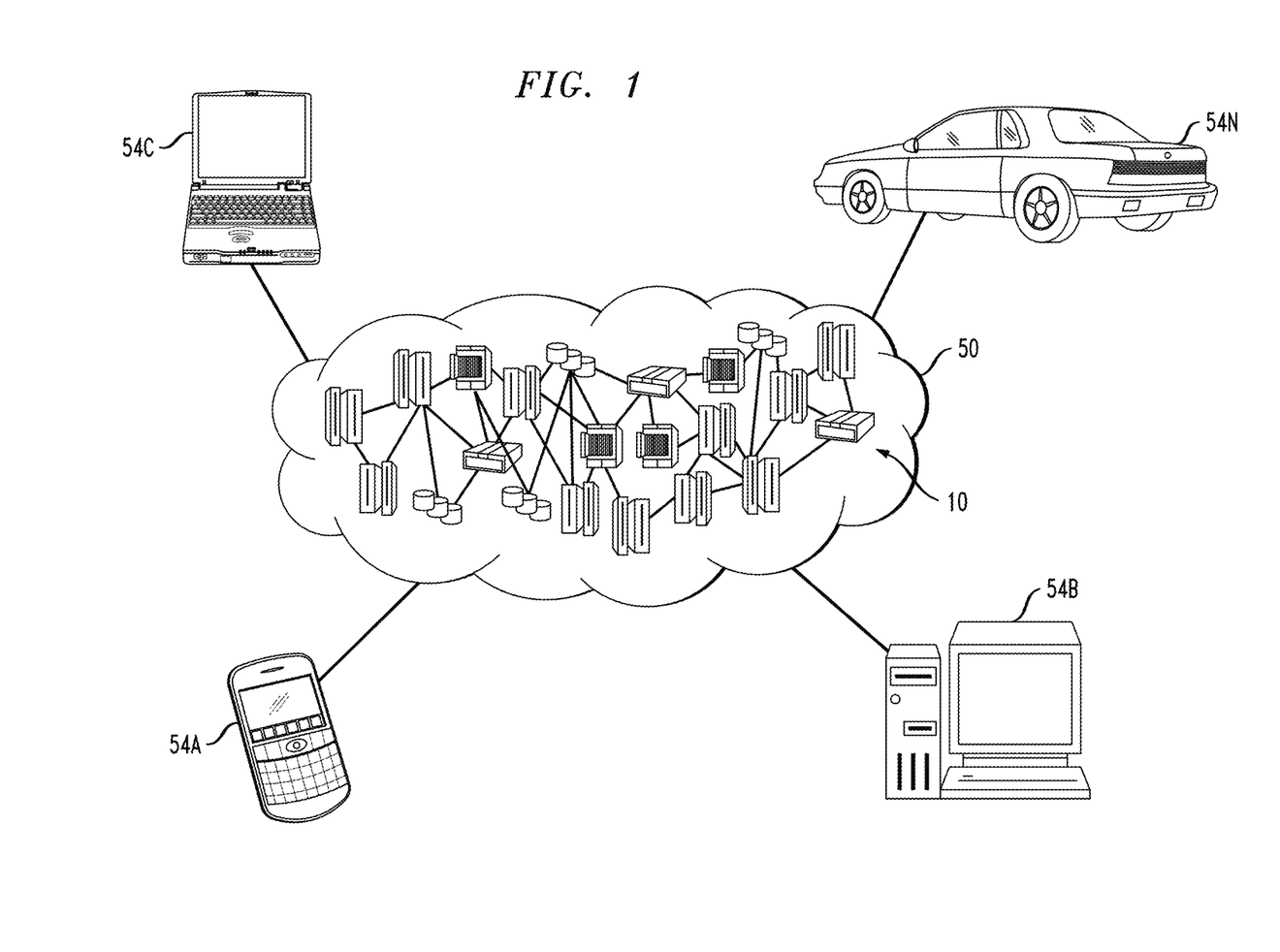
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
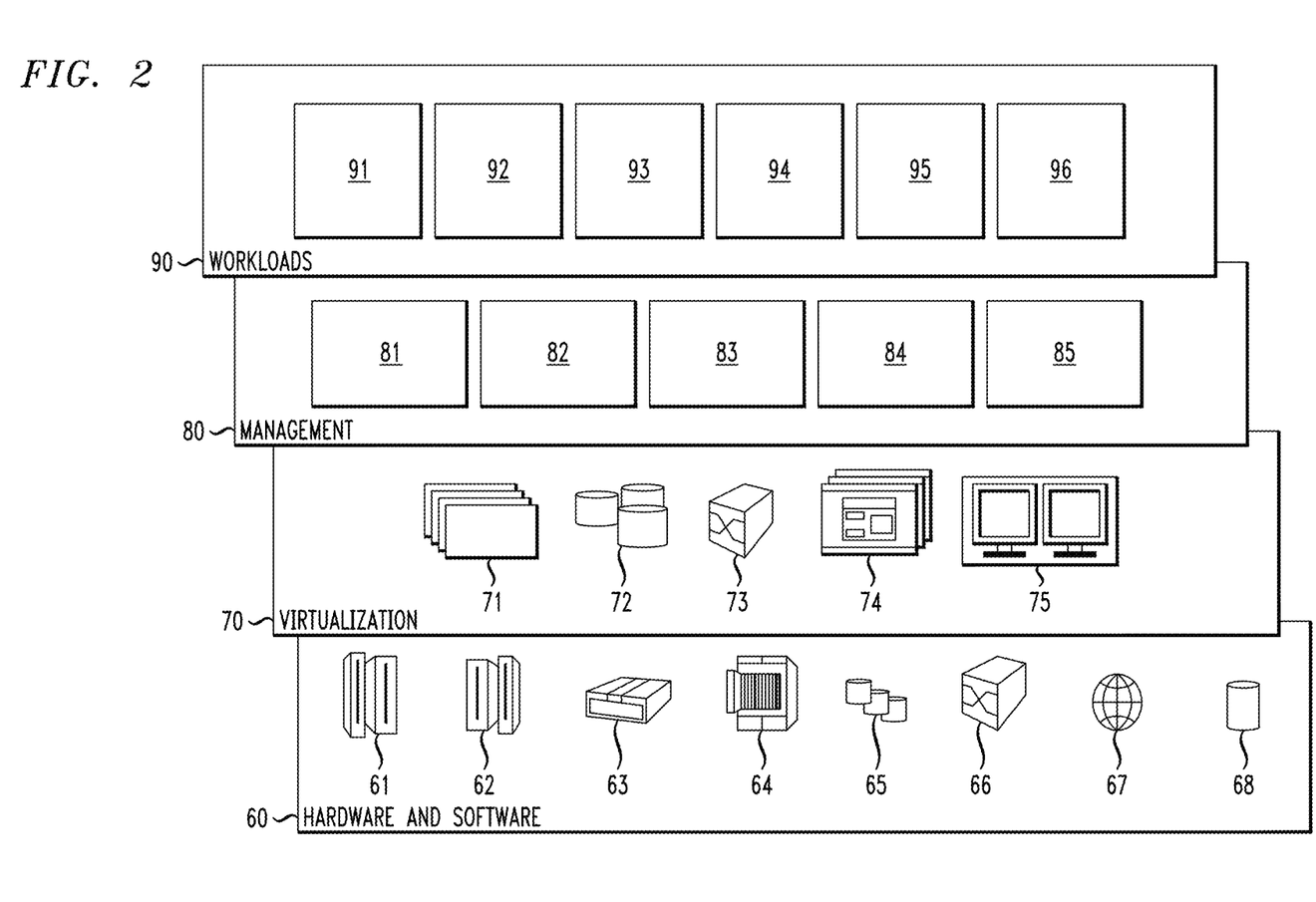
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and infrastructure orchestration and provisioning 96.

Figure 3:
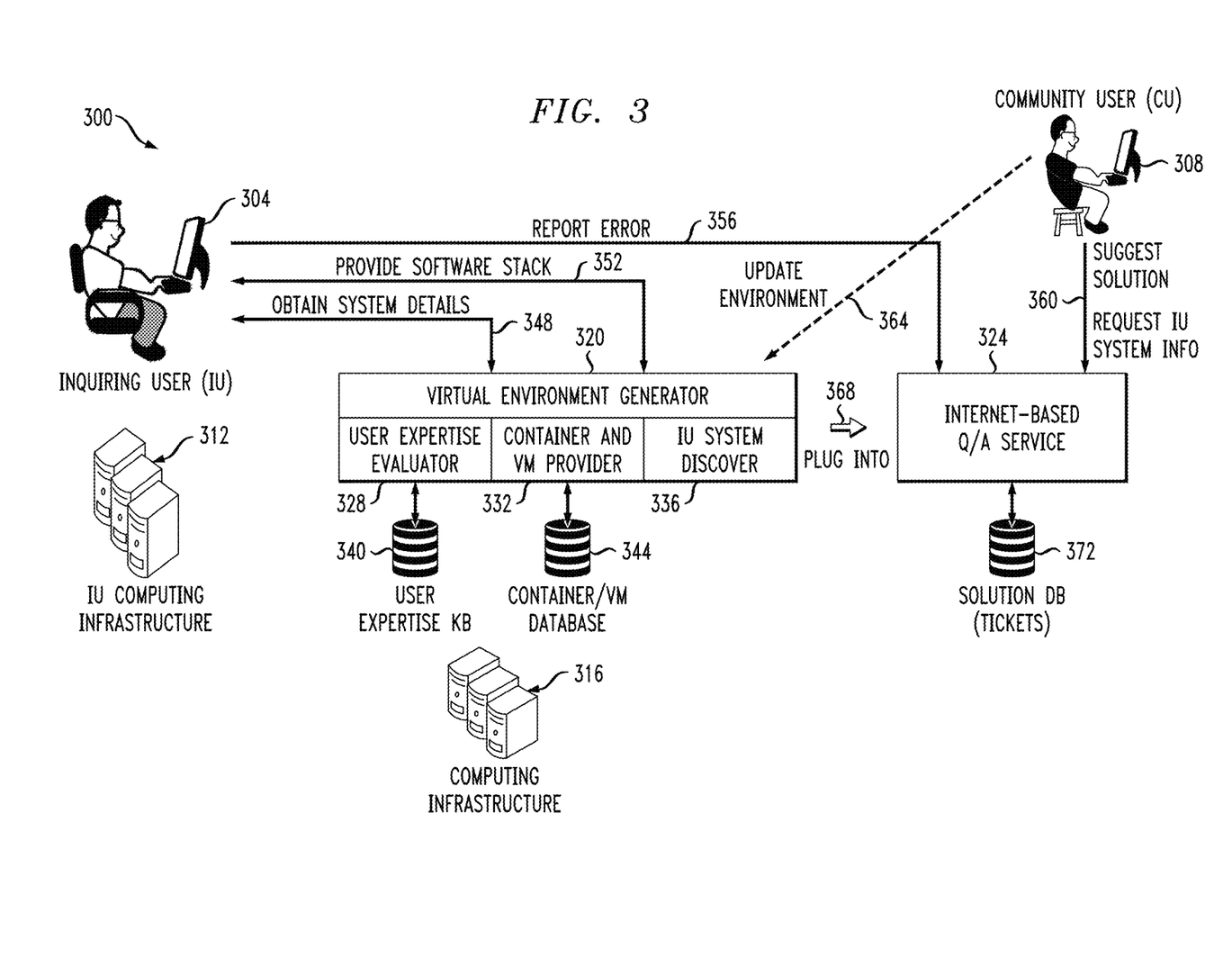
FIG. 3 is a block diagram of a system for providing a customized virtual computing environment, in accordance with an aspect of the invention.

FIG. 3 is a block diagram of a system 300 for generating a customized virtual computing environment, in accordance with an example embodiment. An inquiring user (IU) 304 is a user requesting help from, for example, a community user (CU) 308 (the user answering questions). An IU computing infrastructure 312 is the computing infrastructure that the IU 304 is requesting help for. A computing infrastructure 316 is the computing infrastructure of the virtual environment generator 320 that is used, for example, by the internet-based question and answer service 324. The virtual environment generator 320 generates a virtual computing environment for supporting an IU request, based on the response from the CU 308. The computing infrastructure 316 is used by, for example, the internet-based question and answer service 324 that offers online help to inquiring users 304 based on responses from the community of users 308.

In one example embodiment, the user expertise evaluator 328 evaluates the expertise of a community user 308 based on, for example, rankings of the community user 308, such as "likes" from other community users 308. The container and VM provider 332 provisions containers/virtual machines/runtimes based on, for example, a selected answer from a community user 308. The IU system discover component 336 discovers, for example, the hardware, software stacks, and the like for use in provisioning a virtual computing environment for the inquiring user 304. The user expertise database 340 contains, for example, the identities of the community users 308 and their corresponding expertise levels in given subjects, such as expertise in particular computer languages, operating systems, and the like. The containers/VM database 344 contains, for example, information related to the creation of containers/virtual machines/runtimes, such as initialization scripts, recipes, and the like. The solution (Tickets) database 372 contains, for example, questions and answers from community users 308.

In a workflow in accordance with an aspect of the invention, an inquiring user 304 may identify a problem or issue with, for example, the IU computing infrastructure 312. The user may search for an answer to his or her problem or issue in a question and answer system (such as the internet-based question and answer service 324), may post a question to a community of users 308 (such as via report error 356), or both. The internet-based question and answer service 324 may obtain responses that contain unstructured or structured data and examples of programming codes and configurations related to the problem or issue of the inquiring user 304. The responses may be obtained from various websites that compile solutions from the community users 308. In addition, solutions may be obtained by crawling websites having specifications of software installations, computer programming examples, and the like.

In one example embodiment, the posted question may be entered as a ticket in the solution (Tickets) database 372. The community user 308 may read the posted question and suggest a solution and/or request information regarding the IU computing infrastructure 312 (step 360). The obtained solutions may be ranked, for example, by the reputation of the corresponding community user 308. The inquiring user 304 may have the virtual computing environment instantiated on the computing infrastructure 316 to provide the inquiring user 304 with a runtime environment that potentially addresses the problem or issue. The virtual environment generator 320 may obtain system details regarding the IU computing infrastructure 312 (step 348) and may provision the customized software stack (step 352) as part of the instantiating operation. The runtime environment provided by the virtual computing environment may be used to test the proposed solution to the user's problem or issue. Depending on the results obtained, the inquiring user 304 may work with the community user(s) 308 to further refine the virtual computing environment to address the problem or issue at hand. As described more fully below, the virtual computing environment (including the runtime environment and container) may be generated based on the question and answer data.

Figure 4:
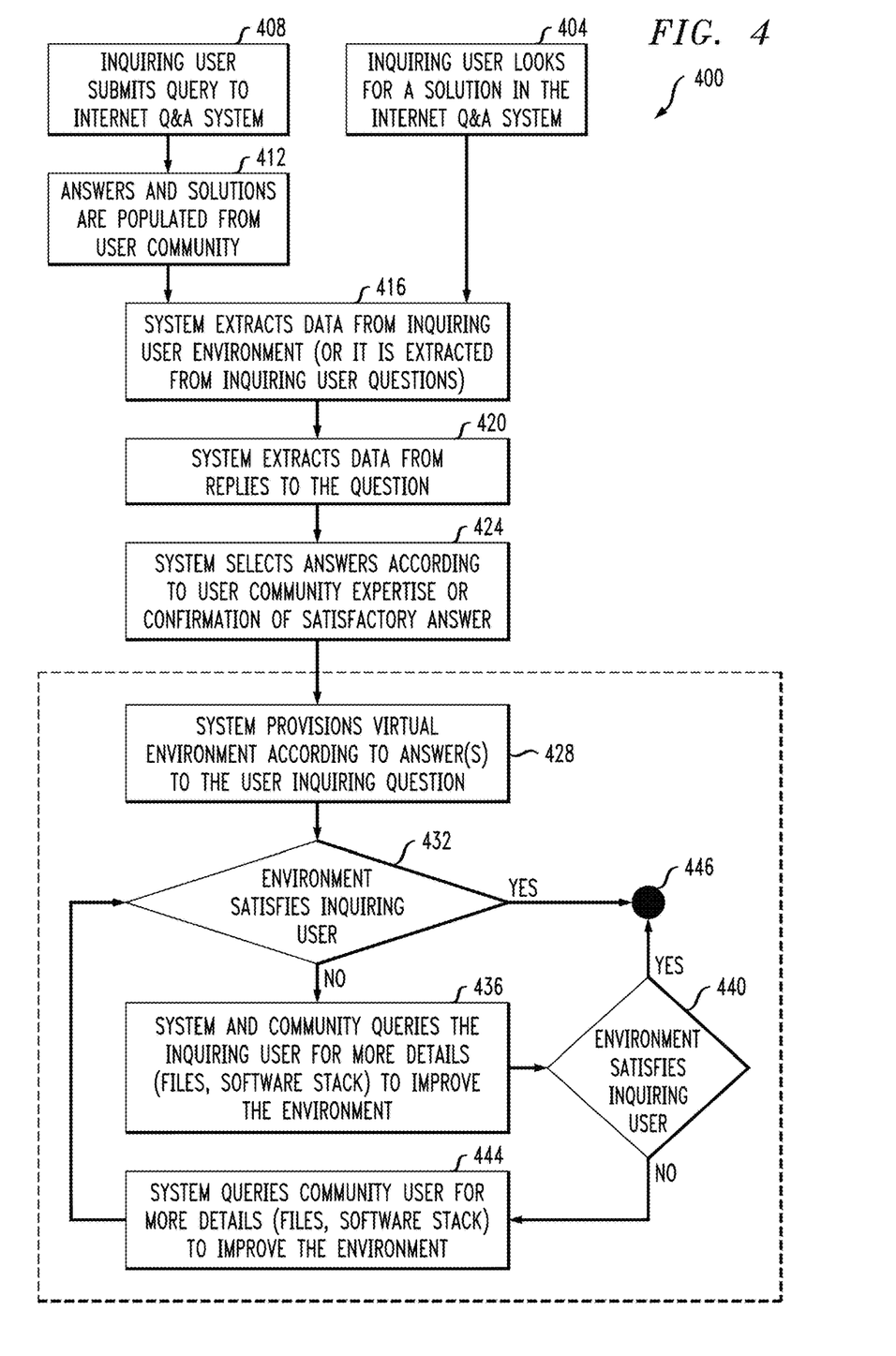
FIG. 4 is a flowchart of an example method for responding to a user inquiry, in accordance with an aspect of the invention.

FIG. 4 is a flowchart of an example method 400 for responding to a user inquiry, in accordance with an example embodiment. In particular, method 400 provisions a customized software stack to, for example, support the internet-based Q&A service 324. Users (e.g. inquiring user 304) submit technical difficulty queries (step 408) or look for solutions to existing ones (step 404). In a non-limiting example, the inquiring user 304 searches for an existing solution in the internet-based question and answer service 324. If, for example, an existing solution is not found, the inquiring user 304 submits a query to, for example, the internet-based Q&A service 324 (step 408). In response, one or more answers and/or solutions (such as answers to a question, comments on an inquiry, and the like) are populated from a user community 308 (step 412). From steps 404 and 412, processing proceeds to step 416, wherein the system 300 extracts data from the inquiring user computing infrastructure 316 and/or from the inquiring user question, extracts data from input provided by such inquiring user 304 through, for example, a GUI, or any combination thereof. For example, the system 300 may extract configuration information from the inquiring user computing infrastructure 316 or from data entered by the inquiring user 304. In step 420, the system 300 extracts data from the responses to the question. For example, the system 300 may extract configuration information for a proposed virtual computing environment from the response. In step 424, the system 300 selects answers according to the user community expertise, confirmation of a satisfactory answer, and the like. For example, the system 300 may select answers from community users 308 who have expertise in the type of operating system used by the inquiring user 304.

In step 428, the virtual environment generator 320 provisions the virtual computing environment according to answer(s) obtained for the inquiring user question. The virtual environment generator 320 may extract question/solution and container/VM keywords and may provision the virtual computing environment according to the question/solution and container/VM keywords, as described more fully below in conjunction with FIGS. 5A and 5B. The virtual computing environment can be available for download or available to run directly in a Web browser. For example, based on the best answers, web crawlers obtain the necessary steps to create containers/VM's/runtimes from tutorials, container hubs, programming blogs, and the like. In decision block 432, determine whether the provisioned virtual environment satisfies the issue of the inquiring user 304. If so, as per the YES branch, proceed to location 446 and await the next query. On the other hand, if the virtual environment does not satisfy the user's inquiry, as per the NO branch, proceed to step 436. In step 436, the system 300 (or the community users 308 via the system 300) can query the inquiring user 304 for additional details in terms of files, software stack, and the like to update the virtual computing environment. Then proceed to decision block 440 and determine whether the (revised) provisioned virtual environment satisfies the issue of the inquiring user 304; if so (YES branch), proceed to location 446 and await the next query. On the other hand, if the (further revised) provisioned virtual environment does not satisfy the user's inquiry (NO branch of decision block 440), the community of users 308 can be queried for more details as well, as per step 444 (for example, the inquiring user 304 may query the community user 308 for additional details regarding the proposed solution); logical flow then proceeds back to decision block 432. The system 300 can be updated over time by both the inquiring user 304 and the community of users 308.

Figure 5A:
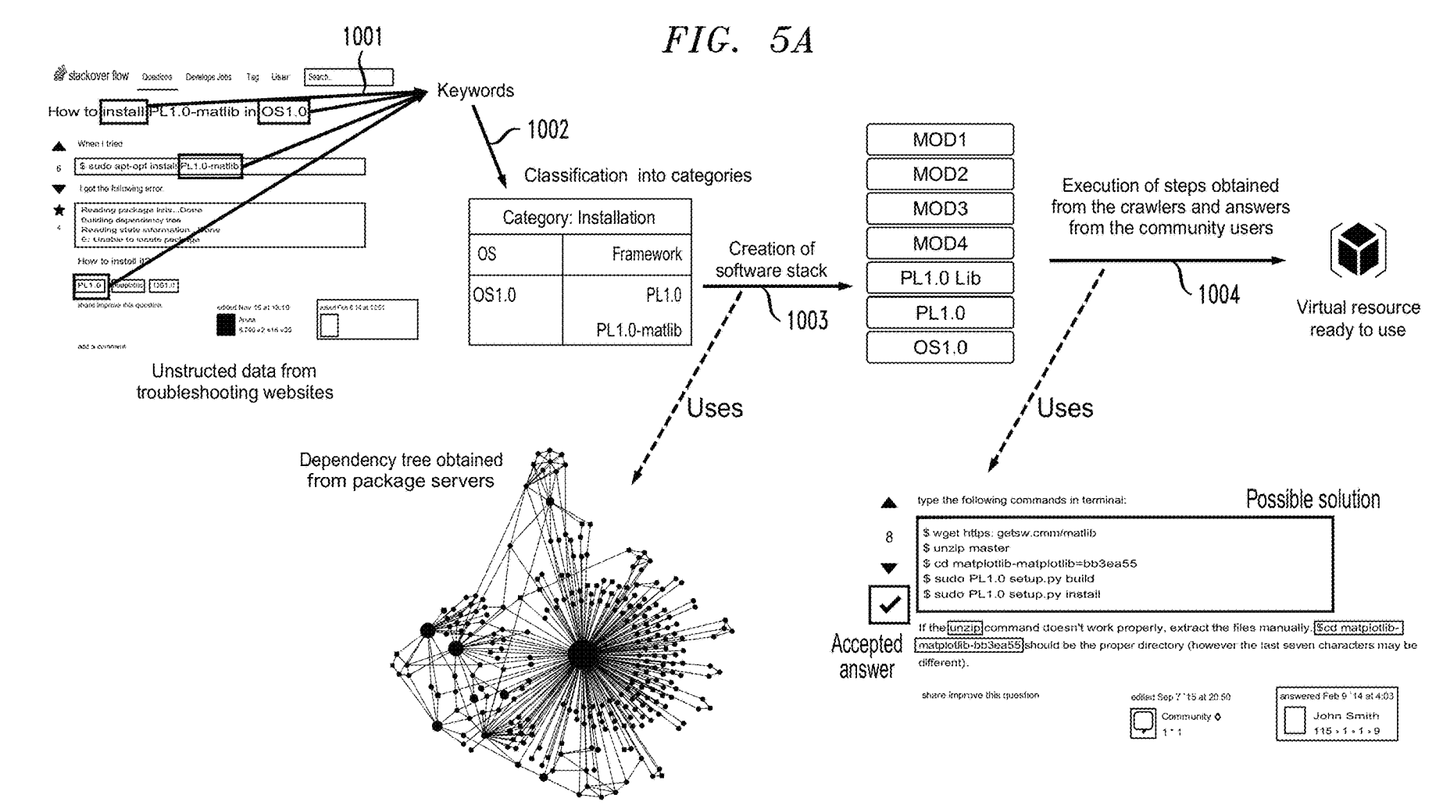
FIG. 5A is an illustration of an example workflow for creating virtual resources, in accordance with an aspect of the invention.

FIG. 5A is an illustration of an example workflow for creating virtual resources, in accordance with an aspect of the invention. In one example embodiment, keywords that may be useful for identifying the software stack for the proposed solution are identified (step 1001). For example, websites that contain information for diagnosing computing environments may be crawled to identify the keywords. The identified keywords may be classified into categories related to software stack identities, such as operating system, libraries, programming language, and the like (step 1002). A complete software stack is built using the classified keyword(s), a dependency tree obtained from a public package management repository, and the software stack components (step 1003). The dependency tree contains a complete list of packages for executing a given software component. A virtual resource is built with the complete software stack plus the extracted solution for the accepted answer (step 1004).

Figure 5B:
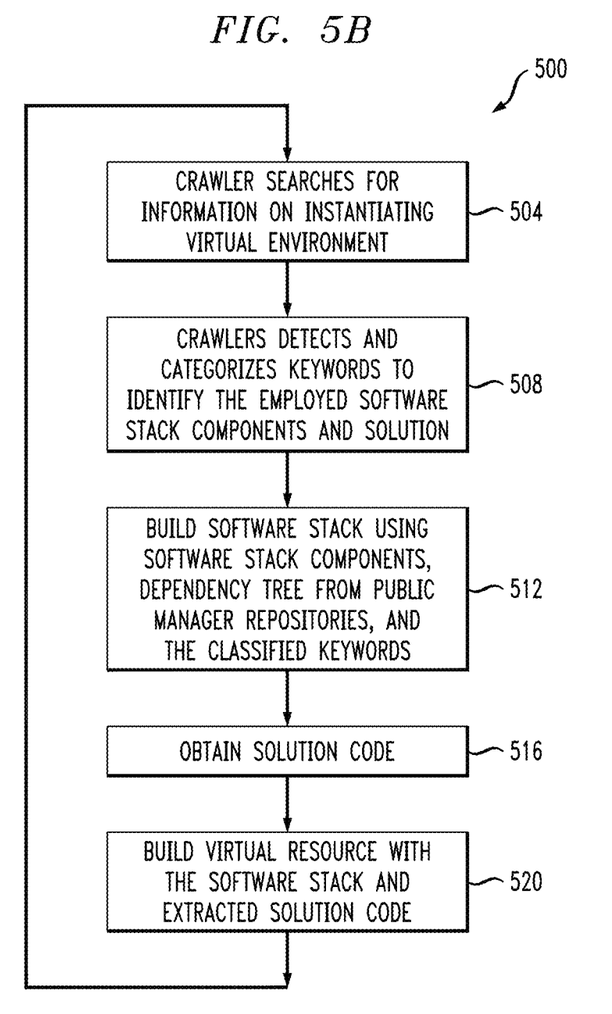
FIG. 5B is a flowchart of an example method for creating a virtual resource, in accordance with an aspect of the invention.

FIG. 5B is a flowchart of an example method 500 for creating a virtual resource, in accordance with an aspect of the invention. The method 500 is used to create the containers/virtual machine information of the container/VM database 344. In one example embodiment, a crawler searches for information on instantiating a virtual environment (step 504). For example, keywords from troubleshooting websites that may be useful for identifying the software stack for the proposed solution may be crawled. The search topics can be obtained from various troubleshooting system entries, such as inquiries and solutions posted by inquiring users 304 and community users 308. The websites may contain blogs, tutorials, and the like regarding, for example, how to perform programming, installation, and configuration tasks on specific computing platforms. The keywords are identified and classified into categories related to software stack identities, such as operating system, libraries, programming language, and the like, and the software stack components and corresponding solution are identified (step 508). The software stack components can be identified, for example, by comparing the text of the cited website(s) and a list of well-known software stack keywords.

A complete software stack is built using the software stack components, a dependency tree obtained from a public package management repository, and the classified keyword(s) (step 512). The solution code is then obtained (step 516). For example, a container/virtual machine may be retrieved from the container/VM database 344 or the solution code can be extracted from the accepted answer in the troubleshooting website. This extraction can be performed by using a code detection software, such as linguist to detect parts of the answer that correspond to executable code. (Each stored solution may also contain a list of keywords to represent the underlying software stack, such as Python, Linux, Numpy, and the like.) A virtual resource is built with the complete software stack and the extracted solution code (step 520).

One or more embodiments advantageously provide automatic discovery of the (inquiring) user system's components and/or personalized virtual environment creation. Indeed, one or more embodiments create a specific resource to mimic the (inquiring) user's environment and provide a solution for her or his problem; for example, creating cloud resources to mimic the (inquiring) user's environment (for example, based on a user technical support query).

One or more embodiments thus solve a problem unique to computers/computer networks and/or improve the functioning of a computer for testing, diagnosing, and debugging hardware and software components within a computing environment. The disclosed customized stack enables the creation of a virtual computing environment capable of providing the cited testing, diagnosing, and debugging capabilities. The disclosed techniques are suitable for a broad range of applications and computing platforms.

In one example embodiment, a method for provisioning a customized software stack is disclosed. A user inquiry for a technical issue is received (steps 356, 408) from an inquiring user 304 and at least one response is received (steps 360, 412) to the user inquiry. A virtual computing environment is provisioned based on one or more characteristics similar to one or more user characteristics of a user computing environment (IU computing infrastructure 312) of the inquiring user 304 and the at least one response (step 428). The at least one response may be received, for example, from a community of users 308 based on unstructured data.

The virtual computing environment may enable the inquiring user 304 to test the virtual computing environment via an internet. In one example embodiment, at least one of the one or more characteristics is an operating system type or a software stack. In one example embodiment, a response that existed prior to reception of the user inquiry is searched for (step 304).

In one example embodiment, data from the user computing environment (IU computing infrastructure 312) of the inquiring user 304 is extracted (step 416), data from the user inquiry is extracted, or data from input provided by the inquiring user 304 is extracted. In one example embodiment, data from one or more responses received from a user 308 of a community is extracted (step 420). In one example embodiment, a response from a user 308 of a community is selected based on expertise or confirmation of a satisfactory response (step 424). In one example embodiment, the virtual computing environment is provisioned based on the at least one response (step 428). In one example embodiment, the inquiring user 304 may be queried (step 436) for an additional detail regarding the user computing environment (IU computing infrastructure 312). In one example embodiment, the user 308 of a community may be queried for one or more additional details (step 444).

In one example embodiment, at least one response is ranked based on a reputation of a community user 308. In one example embodiment, one or more websites are crawled for a specification of a software installation. In one example embodiment, one or more websites with computer programming examples are crawled.

Exemplary System

Figure 6:
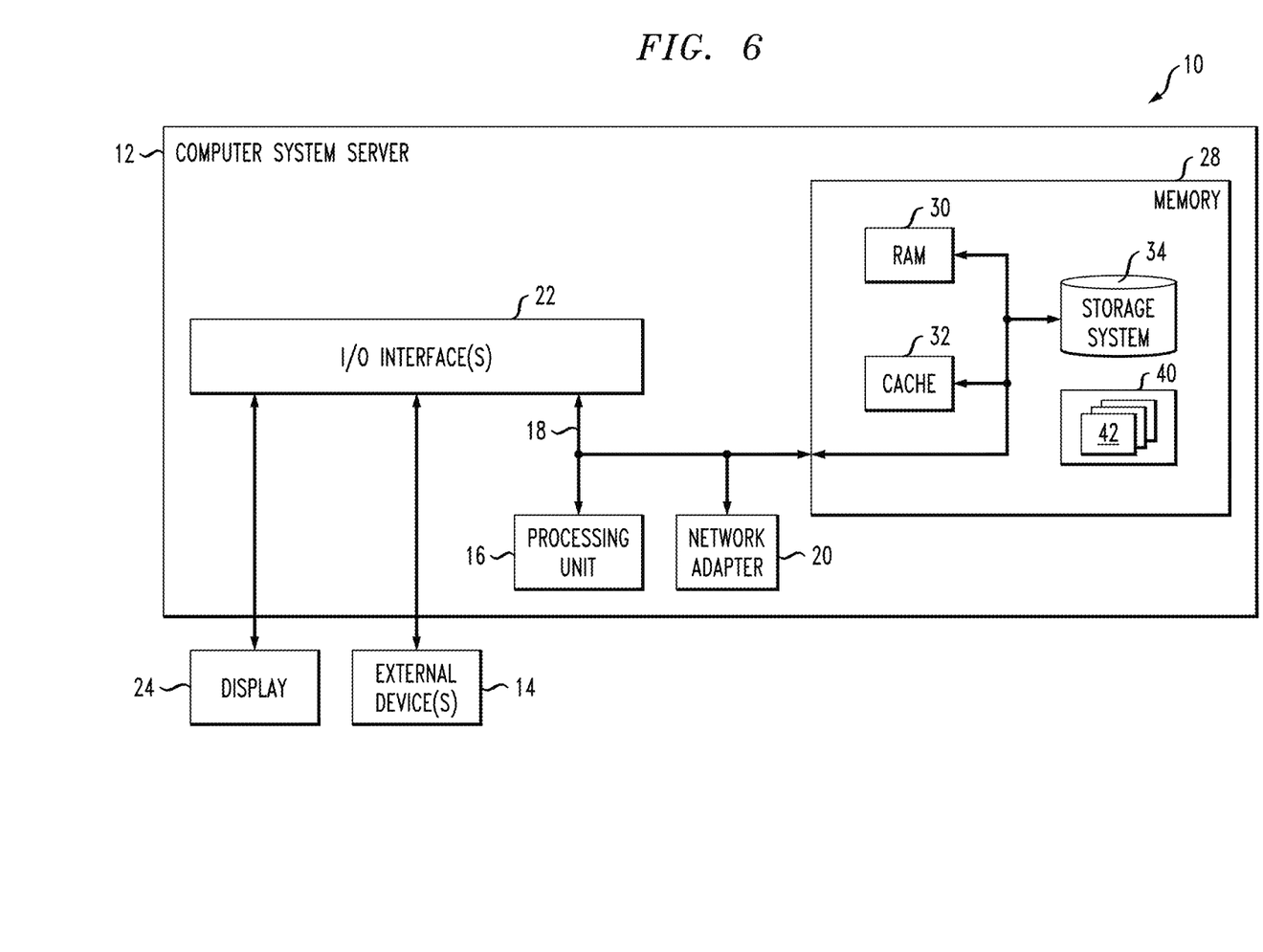
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a virtual environment generator, the method comprising:
   executing the virtual environment generator in an internet-based question and answer service;
   extracting a plurality of keywords from a database, wherein the keywords are associated with a user inquiry associated with an inquiring user;
   classifying the keywords into a plurality of categories;
   extracting solution code from an accepted answer in a troubleshooting website related to the user inquiry by using code detection software to detect parts of the accepted answer that correspond to executable code;
   identifying, using the categories of the keywords, a plurality of first software stack components;
   identifying a plurality of second software stack components using a dependency tree;
   instantiating a customized software stack that creates a virtual computing environment configured to provide testing, diagnosing, and debugging capabilities, the customized software stack comprising the first and the second software stack components and the solution code in the virtual computing environment; and
   enabling a user to access the virtual computing environment.

2. The method of claim 1, wherein at least one inquiry response is received from a community of users based on unstructured data.

3. The method of claim 1, wherein the virtual computing environment enables the inquiring user to test the virtual computing environment via an internet.

4. The method of claim 1, further comprising obtaining two or more of the software stack components of the virtual computing environment.

5. The method of claim 1, wherein at least one of one or more characteristics of a user computing infrastructure of the inquiring user and at least one inquiry response is an operating system type or a software stack.

6. The method of claim 1, further comprising generating a stored solution comprising:
   identifying third keywords from known diagnoses of computing environments; and
   storing the customized software stack in a database accessible by the virtual environment generator.

7. The method of claim 5, further comprising extracting data from the user computing infrastructure of the inquiring user, extracting data from the user inquiry, or extracting data from input provided by the inquiring user.

8. The method of claim 1, further comprising extracting data from one or more inquiry responses received from a user of a community.

9. The method of claim 1, further comprising selecting a response from a user of a community based on user expertise or confirmation of a satisfactory response.

10. The method of claim 1, further comprising:
    provisioning the customized software stack; and
    instantiating a runtime environment of the virtual computing environment using the customized software stack.

11. The method of claim 1, further comprising querying the inquiring user for an additional detail regarding a user computing infrastructure.

12. The method of claim 1, further comprising querying a user of a community for one or more additional details regarding at least one inquiry response.

13. The method of claim 1, further comprising ranking a plurality of responses based on a reputation of a community user corresponding to each of the responses, wherein the reputation is based on likes issued by other community users.

14. The method of claim 1, further comprising crawling one or more web sites for a specification of a software installation.

15. The method of claim 1, further comprising crawling one or more web sites having computer programming examples.

16. An apparatus, the apparatus comprising:
    a memory; and
    at least one processor, coupled to said memory, and operative to:
        execute a virtual environment generator in an internet-based question and answer service;
        extract a plurality of keywords from a database, wherein the keywords are associated with a user inquiry associated with an inquiring user;
        classify the keywords into a plurality of categories;
        identify, using the categories of the keywords, a plurality of first software stack components;
        identify a plurality of second software stack components using a dependency tree;
        instantiate a customized software stack that creates a virtual computing environment configured to provide testing, diagnosing, and debugging capabilities, the customized software stack comprising the first and the second software stack components in the virtual computing environment; and
        enable a user to access the virtual computing environment.

17. The apparatus of claim 16, wherein at least one inquiry response is received from a community of users based on unstructured data.

18. The apparatus of claim 16, wherein the virtual computing environment enables the inquiring user to test the virtual computing environment via an internet.

19. A non-transitory computer readable medium comprising computer executable instructions which when executed by a computer cause the computer to perform a method for provisioning a customized software stack, the method comprising:
    executing a virtual environment generator in an internet-based question and answer service;
    extract a plurality of keywords from a database, wherein the keywords are associated with a user inquiry associated with an inquiring user;
    classifying the keywords into a plurality of categories;
    identifying, using the categories of the keywords, a plurality of first software stack components;
    identifying a plurality of second software stack components using a dependency tree;
    instantiating the customized software stack that creates a virtual computing environment configured to provide testing, diagnosing, and debugging capabilities, the customized software stack comprising the first and the second software stack components in the virtual computing environment; and
    enabling a user to access the virtual computing environment.

20. The non-transitory computer readable medium of claim 19, wherein the virtual computing environment enables the inquiring user to test the virtual computing environment via an internet.

21. The method of claim 6, further comprising identifying the software stack components by comparing text of crawled websites and a list of software stack keywords.

22. The method of claim 1, further comprising generating a stored solution based on the solution code.

\* \* \* \* \*